United States Patent [19]
Wallace et al.

[11] Patent Number: 5,328,274
[45] Date of Patent: Jul. 12, 1994

[54] LIQUID RING VACUUM PUMP-COMPRESSOR WITH SELF ALIGNING REMOVABLE BEARING BRACKET

[75] Inventors: T. Michael Wallace; Charles H. Wunner, both of Charlotte, N.C.

[73] Assignee: Vooner Vacuum Pumps, Inc., Charlotte, N.C.

[21] Appl. No.: 904,987

[22] Filed: Jun. 26, 1992

[51] Int. Cl.$^5$ .............................................. F16C 35/00
[52] U.S. Cl. .................................. 384/428; 384/584; 417/68
[58] Field of Search ................ 384/192, 247, 416–419, 384/428, 434, 438–444, 495, 558, 537, 589; 417/68

[56] References Cited

U.S. PATENT DOCUMENTS

| | | | |
|---|---|---|---|
| 496,347 | 4/1893 | Copeland | 384/584 |
| 1,350,245 | 8/1920 | Stachowski | 384/434 |
| 1,678,968 | 7/1928 | Allen | 384/444 |
| 1,743,683 | 1/1930 | Payne | 384/434 |
| 2,191,890 | 2/1940 | Le Bus | 384/442 |
| 4,004,644 | 1/1977 | Liljekvist et al. | 384/418 X |
| 4,747,752 | 5/1988 | Somarakis | 417/68 |

*Primary Examiner*—Thomas R. Hannon
*Attorney, Agent, or Firm*—Ralph H. Dougherty

[57] ABSTRACT

A bearing housing, particularly for a liquid ring pump, having an angular bottom projection for aligning the housing with and in a groove-containing receiving base with which it mates and to which it is attached, along with locator stops for accurate end-to-end spacing.

9 Claims, 3 Drawing Sheets

LIQUID RING VACUUM PUMP-COMPRESSOR WITH SELF ALIGNING REMOVABLE BEARING BRACKET

FIELD OF THE INVENTION

The present invention relates to liquid ring vacuum pumps or compressors, and more particularly to a bearing housing structure and a method for easy and accurate installation of bearings, as well as quick removal and reinstalling of bearings to their original alignment in the case of bearing failure on an operating pump or other emergency.

BACKGROUND OF THE INVENTION

A liquid ring vacuum pump or compressor apparatus has sequentially an inlet segment, a compression segment, a discharge segment, and a seal segment. The pump includes a generally annular housing having a longitudinal axis; a rotor shaft journaled for rotation in bearings within fixed bearing housings external to the pump housing; a rotor mounted on the shaft for rotation within the housing and having radially extending vanes forming a plurality of working chambers; and a port-containing cone member through which a pumped medium is admitted to and discharged from the working chambers. Pump heads which include fixed bearing housings have the advantage that the bearing location is fixed radially in relation to the axis of the cone, for control of centered position of the rotor mounted on the shaft in relation to the cone mounted on the head. Pump heads with a fixed bearing design have the disadvantage that it is necessary to disassemble the pump to change the bearing. This bearing change procedure is time consuming and costly, especially if the pump is required for production.

Removable bearing brackets on prior and current pump designs have made it possible to change a bearing without disassembling the pump. This has been desired when considering making a quick change of bearings on a pump that is installed for production.

When major bearing failure causes damage to the bearing housing, a removable bearing bracket can be replaced and save the expense of replacing an entire head.

In the past, liquid ring vacuum pumps have incorporated removable bearing brackets of various designs. The most common design is a four arm design mounted to the side of the head. The plane of interface between this bearing bracket and head is vertical and perpendicular to the axis of the pump. The weakness of the design is the lack of positive reference to the center of the cone mounted in the head and the lack of control of infinite number of radial misalignment positions of the shaft relative to the center of the cone mounted on the inside of the head, in the reassembly of the pump. Another weakness of four arm design is that all the static load is held by bolts parallel to the axis of the pump. The tightness of these bolts holds the alignment position of the bearing bracket to the head.

In U.S. Pat. No. 297,942, the inventor, Somarakis, has the bearing bracket interface to the head on a single horizontal plane. This single reference plane controls the elevation of the bearing, but uses machined circles, with inherent tolerances, in each bearing bracket to independently control both the horizontal position, and axis angle in aligning each end of the shaft to the central axis of the cones mounted in the heads. These same machined circles, with their inherent tolerances, in each bearing bracket control the axial in and out position of the two bearing centers.

All of the vertical static load is supported and transferred from the bracket to the head in a horizontal plane and parallel to the axis of the pump.

DESCRIPTION OF THE PRIOR ART

Applicants are aware of the following U.S. Patents concerning liquid ring pumps:

| U.S. Pat. No. | Inventor | Title |
| --- | --- | --- |
| Des. 297,942 | Somarakis | Bearing Housing |
| 4,747,752 | Somarakis | SEALING AND DYNAMIC OPERATION OF A LIQUID RING PUMP |

Somarakis U.S. Pat. No. 4,747,752 shows the current state of the art in bearing housings as depicted in FIGS. 1 and 2 therein.

SUMMARY OF THE INVENTION

A removable bearing bracket includes a combination interface plane consisting of several horizontal and several angular planes parallel to the central axis of the pump or the centers of the two cones of the pump.

Alignment of the bearing to the central axis of the two cones of the pump is controlled by a combination of planes. Two horizontal planes control the elevation, or vertical position of the shaft. Two 45 degree planes parallel to the axis of the pump control both the sidewise or horizontal and angular position of the shaft. The vortex of the two angular planes is an intersection of the planes on the vertical centerline of the head, which is also the vertical center of the cone. An additional lip plane or stop member, vertical and perpendicular to the central axis controls the in and out axial position of the bearings, and maintains the specified distance between the two bearing centers.

All of the vertical static load is supported and transferred from the bearing bracket to the head in a combination of horizontal and angular planes while keeping the load support parallel to the axis of the pump.

OBJECTS OF THE INVENTION

The principal object of the invention is to provide a self-aligning, removable bearing bracket for a horizontal shaft.

It is also an object of this invention to provide means for positively controlling the alignment of a removable bearing bracket or housing without requiring the use of special tools.

It is also an object of the invention to provide positive realignment in three and limited to three directions, vertical, horizontal and axial.

It is also an object of the invention to provide self-aligning or self centering of the two bearing housing bores, which is also the shaft centerline, to the centerline of the cones.

It is also an object of the invention to provide by the shape of the interface plane, gravity force to work to self-align or self-center the bearing bores even during operation subjected to vibrations.

Another object of the invention is to provide positive axial, in and out, location of bearing housing to the head.

Another object of the invention is to provide a relatively small (in relation to head size) cast bearing housing that is simple to repair or relatively inexpensive to replace if severely damaged beyond repair.

It is also an object of the invention to provide a pump housing head in which the working part is separable from the support parts.

BRIEF DESCRIPTION OF THE DRAWINGS

The foregoing and other objects will become more readily apparent by referring to the following detailed description and the appended drawings in which.

DETAILED DESCRIPTION

Figure 1:
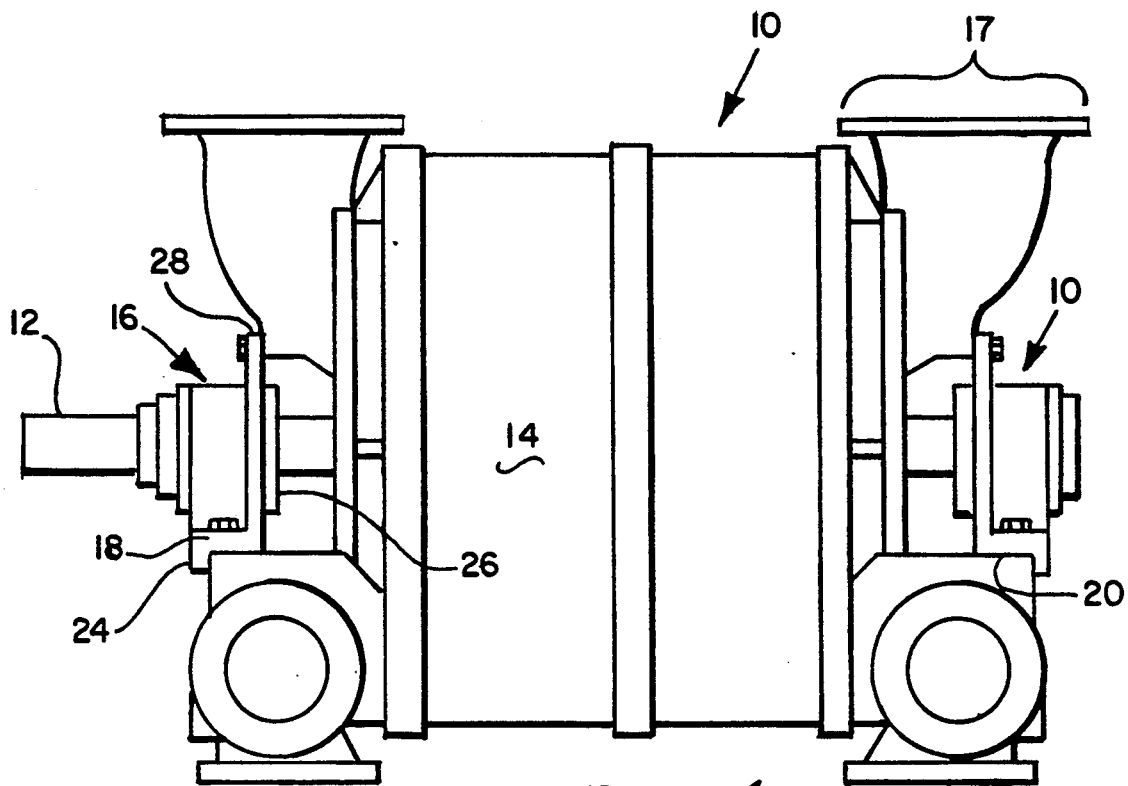
FIG. 1 is a side view of a liquid ring vacuum pump with the invented bearing housing installed on each end thereof.
Figure 2:
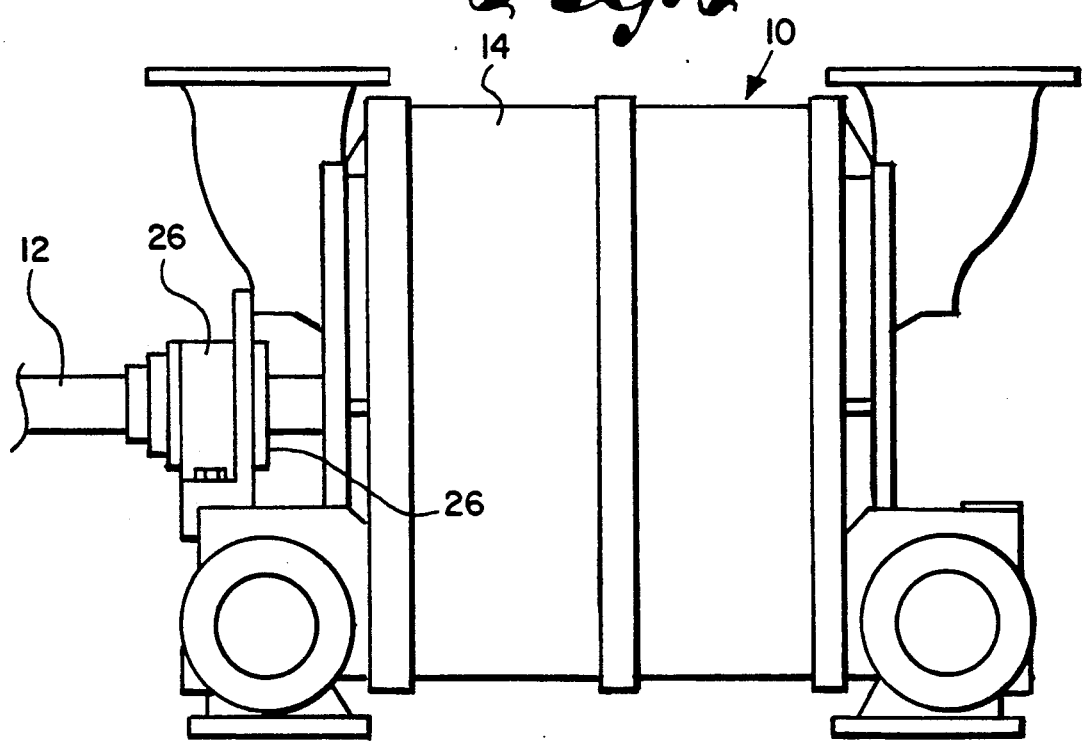
FIG. 2 is a side view of the liquid ring pump of FIG. 1 with the bearing housing removed from the right side.
Figure 4:
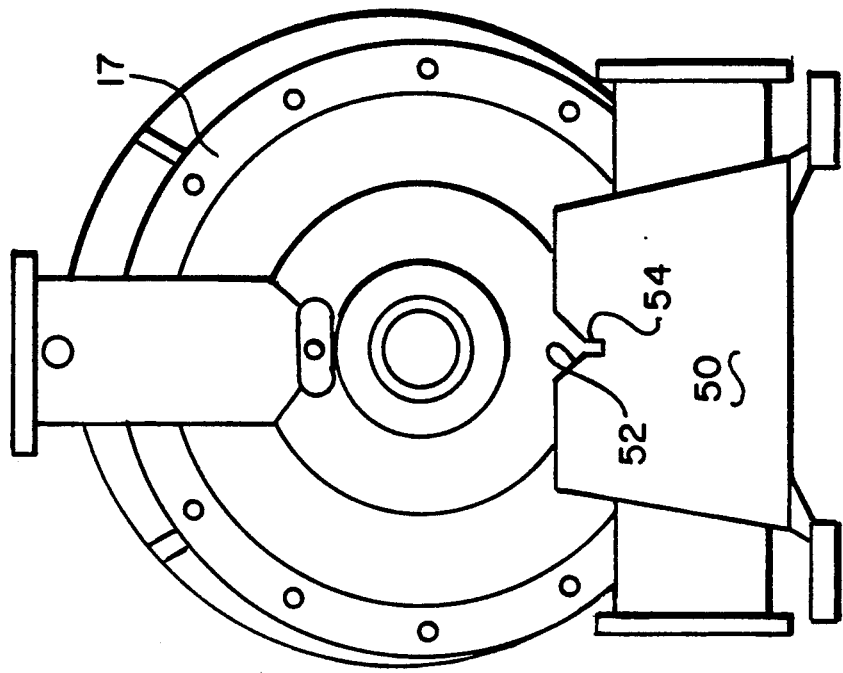
FIG. 4 is a right hand end view of the vacuum pump as shown in FIG. 2.

Referring now to the drawings, a liquid ring pump 10 includes a shaft 12 connected to an associated drive means, not shown, the shaft extending along a longitudinal axis through pump housing 14. The shaft is journaled for rotation in bearing housings 16 mounted on the head 17 at each end of the pump housing.

Figure 3:
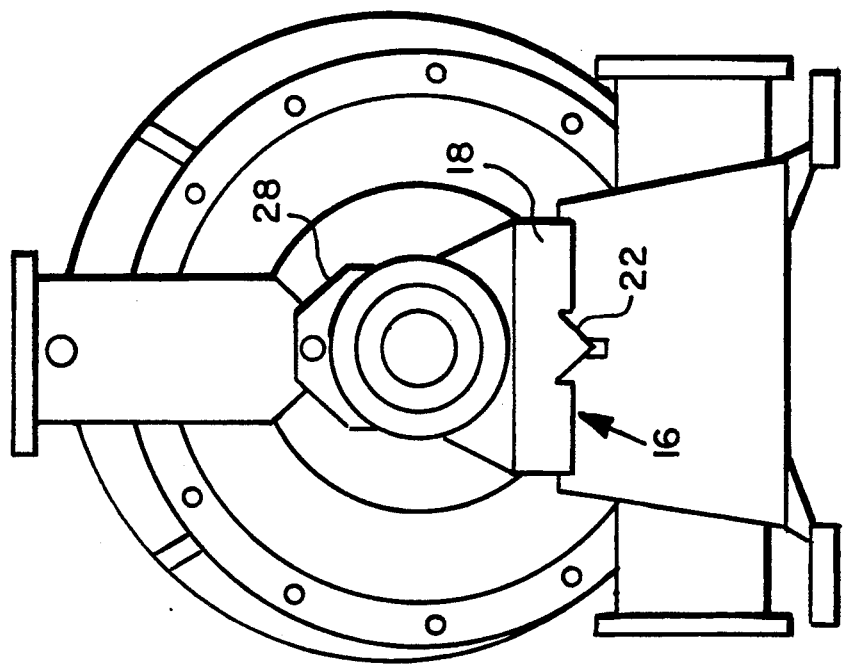
FIG. 3 is a left hand end view of the vacuum pump shown in FIG. 1.
Figure 5:
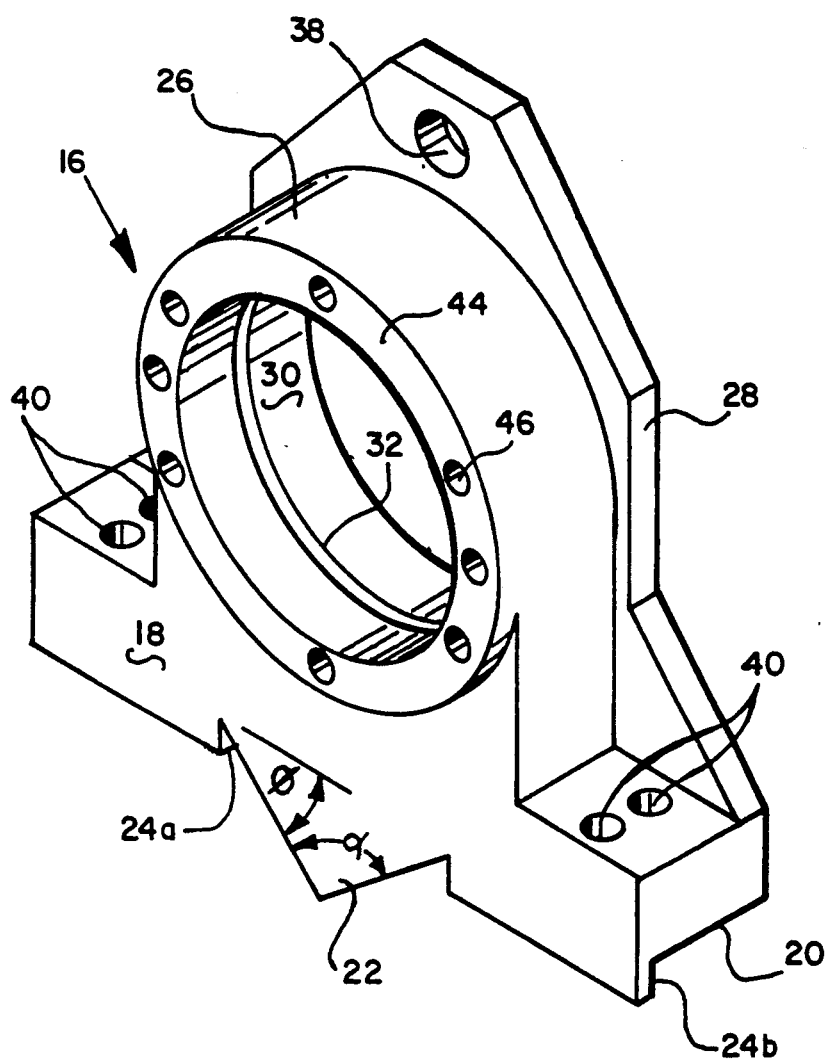
FIG. 5 is an isometric view of a bearing bracket in accordance with the invention.

The invented bearing housing 16, as best shown in FIG. 5, has a base or pedestal 18 with a smooth, preferably machined, bottom surface 20 on its underside. Extending downwardly from the base 18 is an angled central axial aligner member 22. The angle φ from the horizontal can vary from 30 to 60 degrees, but generally is 45 degrees. The total angle α can vary from 60 to 120 degrees, but generally is 90 degrees. Depending downwardly from each side of the pedestal and flanking the central aligner 22 are locator stops 24a and 24b. Upstanding from pedestal 18 and aligned on the vertical axis of the bearing housing are bearing mounting 26 and associated vertical mounting plate 28. Bearing mounting 26, which extends beyond mounting plate 28 as shown in FIG. 1, includes a cylindrical bore 30 having a lubrication groove 32 therein for oil or grease. A top mounting hole 38 is provided in the vertical mounting plate above the bore and on the vertical centerline of the housing 16, as shown in FIG. 3. Vertical mounting means such as bolt holes 40 are provided on each side of the pedestal 18. Four such vertical holes 40 are shown in the pedestal base, however only two may be provided, if desired, one at each end of the pedestal.

Machined bearing mounting face 44 is provided with holes 46 for installation of a bearing cap on the bearing housing, holes 46 preferably being threaded to receive bolts.

Housing 16 rests on bearing support head 50 which has a central groove 52 (see FIG. 3) for receiving mating projection 22. Preferably, a trough 54 is provided at the apex of the groove 52, for accumulating foreign matter, and preventing misalignment from a small particle of foreign matter within the groove. The trough 54 is shown as having square corners, but can have any desired configuration, including rounded.

The combination of horizontal and angular planar surfaces on the bottom surface of the pedestal transfers the static and dynamic load of the bearing to the head. These bearing surfaces are clean, machined surfaces with no gaskets. Continuous contact of the bearing bracket to the mating and supporting head surface insures equal distribution of load, with minimal distortion of the bracket under dynamic loading, and maintains the engineered standard fit as originally manufactured.

The co-planar horizontal surfaces at the outer ends of the bottom surface of the pedestal control the elevation or vertical alignment of the bearing in relation to the central axis of the two cones of the pump.

The two intersecting angular planar surfaces of the downward projection, the apex of which is in the center of the bottom surface of the pedestal, control the side to side position or horizontal alignment of the bearing in relation to the central axis of the internal operating cones of the pump.

At the edge of the co-planar horizontal surfaces at the outer ends of the bottom surface of the pedestal, away from the pump housing, the two co-planar vertical surfaces form locator stops which to control the in and out position or axial distance alignment of the bearing in relation to the end to end separation of the two internal operating cones of the pump.

In operation, the bearing housing is situated on the bearing support head 50 with the aligner member 22 mating with the central groove 52 in the support, and the locator or limit stops 24 against the end of the support 50. The bearing housing is then fixed to the pump by placing bolts through holes 40 and the vertical mounting plate 28 is fixed to the pump housing by placing a bolt through hole 38. The housing 16 is properly aligned for operation without necessity for further action. If it becomes necessary to replace a bearing or housing during operation, the procedure is the same, which assures accurate alignment at all times.

The attachment locations 40 and 38 form a triangle within which nearly all of the torque forces are situated, which helps to stabilize the pump when in operation.

SUMMARY OF THE ACHIEVEMENT OF THE OBJECTS OF THE INVENTION

From the foregoing, it is readily apparent that we have invented an improved self-aligning, removable bearing bracket for a horizontal shaft, means for positively controlling the alignment of a removable bearing bracket or housing without requiring the use of special tools, and means for eliminating radial misalignments of such bearings.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. A bearing housing for a liquid ring vacuum pump or compressor apparatus, comprising:
    a base;
    a cylindrical unitary housing upstanding from said base adapted to receive and journal a shaft therein, said cylindrical housing having a cylindrical bore with a horizontally oriented axis;
    said base having a pair of spaced horizontal coplanar bearing surfaces and a central v-shaped projection therebetween extending downwardly with the apex of the projection parallel to the axis of the cylindrical housing, for engaging a mating groove in a bearing housing support.

2. Apparatus according to claim 1, further comprising a pair of downwardly extending stops integral with said base, said stops being normal to said horizontally oriented axis.

3. Apparatus according to claim 1, further comprising means for removably attaching said bearing housing to a mating support.

4. Apparatus according to claim 1, further comprising means for removably attaching said bearing housing to a pump housing.

5. Apparatus according to claim 4, wherein said means for attaching said bearing housing comprises a vertical mounting plate having a horizontal bolt hole therethrough above said cylindrical bore, and at least one vertical bolt hole through each horizontal coplanar surface of said base, whereby horizontal and vertical attachment points form a triangle within which all torque forces are situated to facilitate stabilization of a shaft journaled in said cylindrical housing.

6. Apparatus according to claim 1, wherein said central V-shaped projection has an apex angle of from 60 to 120 degrees.

7. Apparatus according to claim 1, wherein said cylindrical housing has an annular lubrication groove within said cylindrical bore.

8. In a head for closing the end of a cylindrical unitary housing of a liquid ring vacuum pump or compressor apparatus, including a bearing housing support, the improvement comprising:

a pair of spaced horizontal co-planar bearing surfaces on the upper surface of said bearing housing support with a central v-shaped groove therebetween; and a bearing housing having a central downwardly extending v-shaped projection with the apex of the projection parallel to the axis of the cylindrical housing, and engaging said central v-shaped groove in said bearing housing support.

9. Apparatus according to claim 8, further comprising a trough in the apex of said v-shaped groove.

* * * * *